(12) United States Patent
Ahrenholtz (10) Patent No.: US 10,780,659 B2
(45) Date of Patent: Sep. 22, 2020

(54) PATCH POD CARTRIDGE FOR A TIRE REPAIR TOOL, A TIRE REPAIR TOOL INCLUDING THE CARTRIDGE AND A METHOD OF USE

(71) Applicant: PATCH N RIDE LLC, Hollywood, FL (US)

(72) Inventor: Ted Eric Ahrenholtz, Minnetonka, MN (US)

(73) Assignee: Patch N Ride LLC, Hollywood, FL (US)

(*) Notice: Subject to any disclaimer, the term of this patent is extended or adjusted under 35 U.S.C. 154(b) by 746 days.

(21) Appl. No.: 15/405,924

(22) Filed: Jan. 13, 2017

(65) Prior Publication Data

US 2018/0200971 A1    Jul. 19, 2018

(51) Int. Cl.
*B29C 73/12*    (2006.01)
*B29C 73/10*    (2006.01)

(52) U.S. Cl.
CPC ............. *B29C 73/12* (2013.01); *B29C 73/10* (2013.01)

(58) Field of Classification Search
USPC .................... 81/15.5, 15.7; 152/313, 370
See application file for complete search history.

(56) References Cited

U.S. PATENT DOCUMENTS

| | | | |
|---|---|---|---|
| 490,369 A | 1/1893 | Sloper | |
| 557,851 A | 4/1896 | Mercier | |
| 607,379 A | 7/1898 | Jones | |
| 611,414 A | 9/1898 | Meeker | |
| 1,942,116 A | 1/1934 | Mullen | |
| 2,646,707 A | 7/1953 | Notz | |
| 2,966,190 A * | 12/1960 | Nowotny | B29C 73/08 152/370 |
| 2,990,736 A | 7/1961 | Crandall | |
| 3,013,454 A | 12/1961 | Gruber | |
| 3,052,141 A * | 9/1962 | Mitchell | B29C 73/08 81/15.7 |
| 3,083,597 A | 4/1963 | Best | |
| 3,162,230 A * | 12/1964 | Best | B29C 73/08 152/370 |
| 3,250,156 A | 5/1966 | Best | |
| 3,400,445 A | 9/1968 | Crandall et al. | |
| 4,142,428 A | 3/1979 | Vielman | |
| 4,502,355 A | 3/1985 | Squyres | |
| 5,609,715 A | 3/1997 | Gallentine | |
| 7,377,197 B1 | 5/2008 | Lin | |
| 8,707,829 B2 | 4/2014 | Kerner | |
| 9,205,607 B2 * | 12/2015 | Deiser | B29C 73/12 |
| 2006/0117909 A1 | 6/2006 | Hsu | |
| 2013/0031759 A1 | 2/2013 | Cole | |

* cited by examiner

*Primary Examiner* — Joseph J Hail
*Assistant Examiner* — Shantese L McDonald
(74) *Attorney, Agent, or Firm* — Laurence A. Greenberg; Werner H. Stemer; Ralph E. Locher (57) ABSTRACT

A tire repair tool includes a body portion and a cartridge portion. The tool is used to inject an adhesive or glue and a patch into a puncture in a tire, while the tire is still engaged with the wheel, in order to permanently patch a punctured inner tube of the tire. More particularly, a push rod is used to rupture an adhesive pod, elevate an elevator assembly and eject the adhesive and patch through an outlet tube of the tool and into the existing puncture of the outer tire. A patch is affixed over a puncture in the inner tube by the adhesive to permanently patch the inner tube without having to remove the tire from the wheel or rim.

20 Claims, 8 Drawing Sheets

PATCH POD CARTRIDGE FOR A TIRE REPAIR TOOL, A TIRE REPAIR TOOL INCLUDING THE CARTRIDGE AND A METHOD OF USE

BACKGROUND OF THE INVENTION

Field of the Invention

The present invention relates to a tire repair tool and, more particularly, to a tire repair tool including a patch pod cartridge for permanently patching tires, in situ, without removing the tire from the wheel or the wheel from the conveyance.

Description of the Related Art

U.S. Pat. No. 9,205,607, assigned to the present assignee and incorporated by reference, herein in its entirety, discloses a tire repair tool, system and method of use. The repair tool of the '607 patent includes a body portion and a cartridge portion, wherein a spring is used to eject a patch assembly and adhesive through an outlet tube of the tool and into the existing puncture of an outer tire. The patch is, thus, affixed over a puncture of the inner tube by the adhesive.

What is needed is a tire patching device, system and method that can be used to easily and quickly patch a puncture in the inner tube of a tire using a patch inserted through the outer casing of the tire without removing the tire and/or inner tube from the wheel. What is additionally needed is a self-contained tire repair unit that is portable, easy to setup and easy to use, and which has a patch pod assembly in which the adhesive is maintained pre-packaged until use. What is further needed is a simplified single-use patch pod cartridge used as part of a tire repair tool.

SUMMARY OF THE INVENTION

The present invention satisfies the needs set forth above and, in particular, provides a portable tool that provides immediate permanent and uncomplicated tire repair on the go. More particularly, a tire repair device is provided that can be used to repair bicycle tires and other closed pneumatic applications. In one particular embodiment, the tire repair device is a self-contained unit including a tool body and a cartridge containing an encapsulated adhesive and a patch. The tool is used to rupture the adhesive capsule and force the adhesive and patch through the outer casing of the tire and into a space between the outer casing and the inner tube. In another particular embodiment of the invention, the tool includes a manually actuated awl to force the adhesive and patch into the space between the outer casing and the inner tube.

Other features, which are considered as characteristic for the invention, are set forth in the drawings and the appended claims.

Although the invention is illustrated and described herein as embodied in a patch pod cassette module for a tire repair tool, a tire repair tool including the cassette module and method of use, it is nevertheless not intended to be limited to the details shown, since various modifications and structural changes may be made therein without departing from the spirit of the invention and within the scope and range of equivalents of the claims.

The construction of the invention, together with additional objects and advantages thereof, will be best understood from the following description of the specific embodiment when read in connection with the accompanying drawings.

BRIEF DESCRIPTION OF THE DRAWINGS

For a fuller understanding of the nature of the present invention reference should be made to the following detailed description taken in connection with the accompanying drawings in which.

DETAILED DESCRIPTION OF THE PREFERRED EMBODIMENT

The Tool:

Referring now to FIGS. 1A-10, a tire repair tool or device 100 is provided. The tool 100 is used to permanently repair punctured tire tubes on the go and without removing the wheel and tire from the vehicle. In one particular embodiment of the invention, the tire repair tool 100 is used to patch bicycle tires, and in particular, both clincher style and tubular or "sew-up" style bicycle tires. This is not meant to be limiting, however, as the tool 100 can be used to repair other types of tires and/or tires for other vehicles. Additionally, it should be noted that the term "puncture", as used herein, encompasses all types of perforations, cuts, holes or wounds to the tire that cause it to lose air.

The tire repair device 100 includes a handle 110 and a cartridge 120. A cap 140 may be removably secured to the handle 110 via a friction fit to a neck or lip 102 of the handle 110, in order to cover and protect a push rod gate 122 of the cartridge 120. In the most preferred embodiment, the housing 110 and cartridge 120 are separable from one another, as shown more particularly in FIG. 2. Thus, in the present preferred embodiment of the invention, the handle 110 and cap 140 form a reusable tool housing, while the cartridge 120 is made to be disposable. However, in an alternate embodiment, the handle 110 and cartridge 120 can be made as a unitary disposable, one-time use tool, or even as a single, entirely reusable unit, without departing from the scope or spirit of the present invention.

The Handle and Awl Assembly:

The handle 110 of the tire repair tool 100 includes an awl assembly or push rod assembly 130 that is movable within the assembled housing parts 110a. In use, a push rod 132 of the awl assembly 130 acts as a ramrod to push a patch out through a gate 122 of the patch pod cartridge 120. Additionally, a tip 139 of the push rod 132 is used to position the gate 122 in the tire 190. Sliding of the awl assembly 130 is used in the present embodiment to perforate a blister pack filled with adhesive and to raise the patch pod assembly into its deployment position.

The awl assembly 130 includes a molded portion 134 connecting the handle push rod 132 to a button support 136. An awl lock button 138 on a support 136 is held in place by an awl button cover 137. The awl assembly 130 slides, via a neck 135, along a slot 112 formed through the top face of the handle 110 while the support 136 is maintained (i.e. in a channel 113 of the top face of the housing 110). Additionally, the awl assembly 130 is maintained in the handle 110 in alignment with a hole 114a of an internal wall 114, through which the push rod 132 passes. Hole 114a is keyhole shaped, in order to accommodate passage of the shaft of the push rod 132 and its integral finger 131. The internal wall 114 additionally defines the back end of a cartridge chamber 116 of the handle 110, which receives cartridge 120.

Figure 1A:
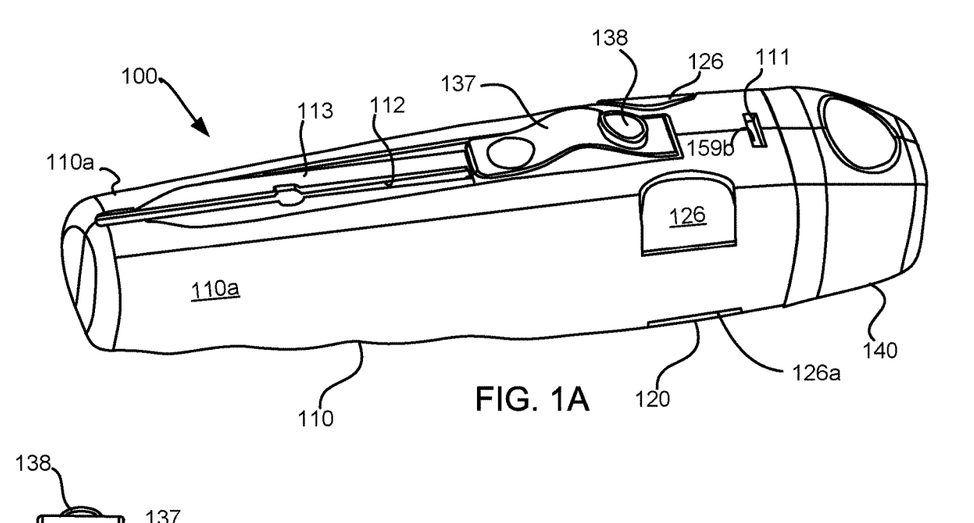
FIG. 1A is a perspective view of a tire repair tool in accordance with one particular embodiment of the invention.
Figure 1B:
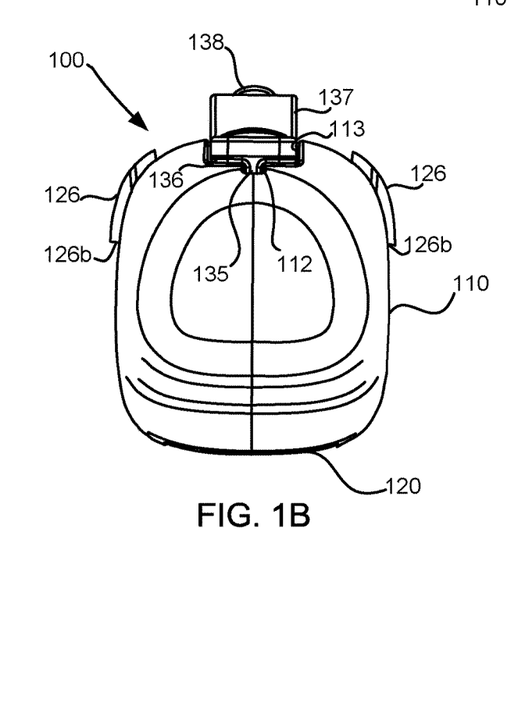
FIG. 1B is a rear plan view of the tire repair tool of FIG. 1.
Figure 2:
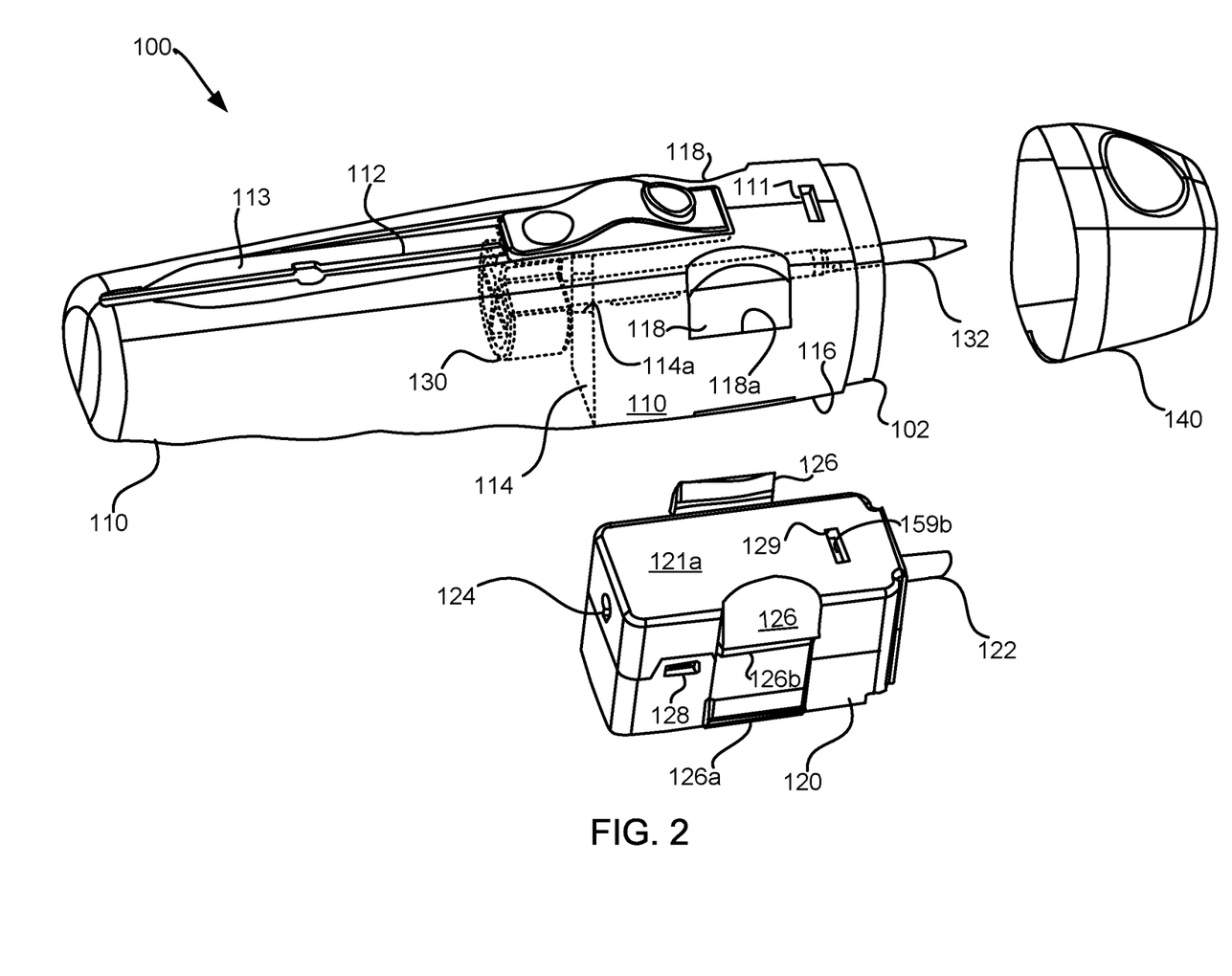
FIG. 2 is a partially exploded, perspective view of the tire repair tool of FIG. 1.
Figure 3:
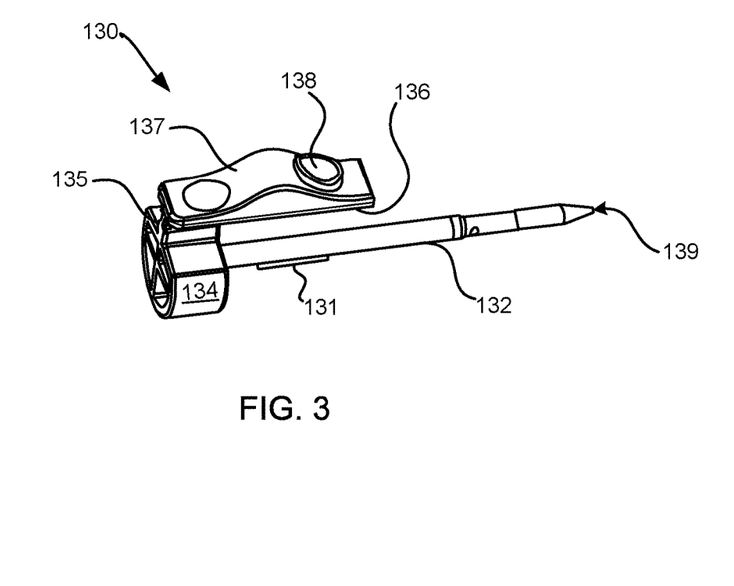
FIG. 3 is a perspective view of an awl assembly in accordance with one particular embodiment of the present invention.
Figure 4:
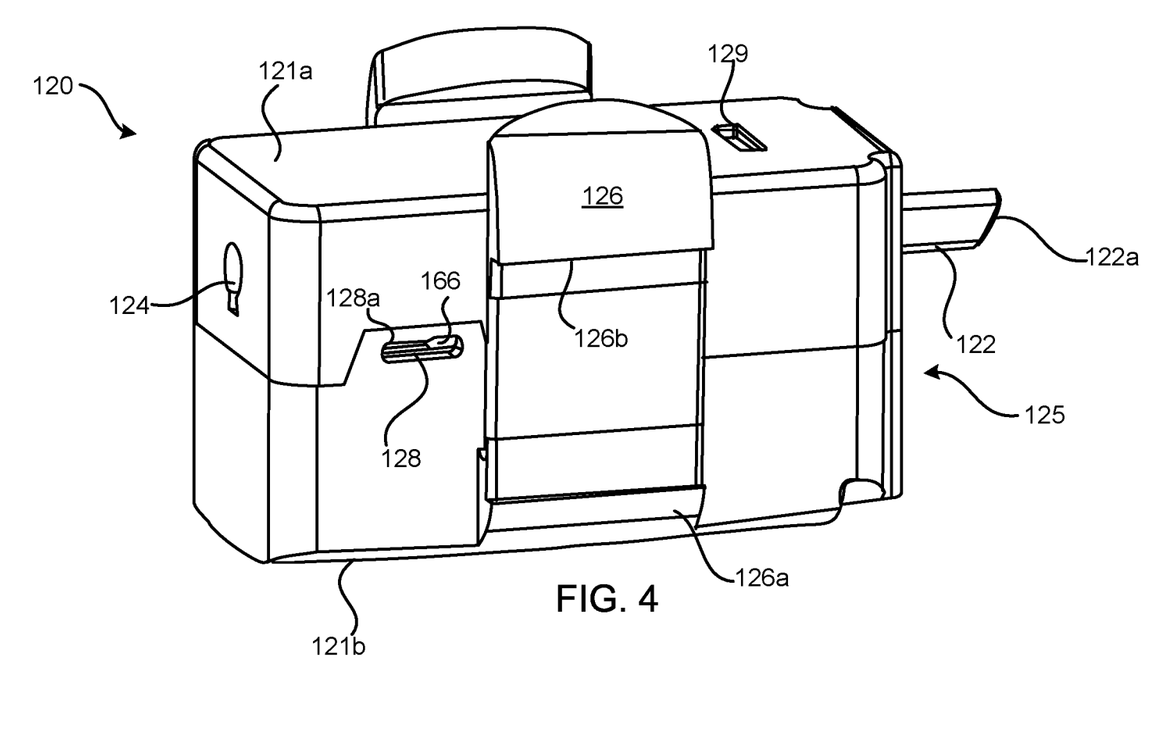
FIG. 4 is an enlarged perspective view, taken from the rear, of a patch pod cartridge in accordance with one particular embodiment of the invention.

The awl assembly 130 is moveable between a withdrawn position, in which the push rod 132 is disposed completely inside the handle (i.e., with the push rod point 139 disposed to the left of the internal wall 114) and an extended position illustrated in FIG. 2, by pushing the awl button 138 and sliding the button cover 137 to slide the awl assembly 130 along the slot 112. When the handle push rod 132 is in the fully extended position, a notch formed in the housing 110 at the end of the slot 112 captures and retains a leaf spring-biased tooth or projection carried on a base or carriage of the lock button 138. Pushing the button 138 will release the projection from the notch, thus permitting movement of the awl assembly 130 relative to the housing 110. The user can slide the awl assembly 130 by sliding the awl button cover 137 linearly backwards or forwards on the handle 110 in the direction of arrow A or arrow B, depending on the action to be taken.

The Patch Pod Cartridge:

In the present particular embodiment, the patch pod cartridge 120 can be inserted into, or removed from, the chamber 116 of the handle 110 when the awl assembly 130 is in the withdrawn position. In the present preferred embodiment, the handle 110 mates with the cartridge 120 by friction fit and/or by a locking engagement mechanism. In a further embodiment of the invention, the handle 110 and cartridge 120 can be permanently mounted together and/or formed as a unitary body, such that the entire unit 100 is pre-loaded with a single glue pod 174 and patch assembly 150. In such a case, the entire device 100 may be disposed of after a single use.

In the preferred embodiment illustrated, a locking mechanism is provided including the spring arms 126 and window 118. Spring arms 126 are affixed to the left and right sides of the cartridge 120 by a fixed hinge point 126a, while the upper portion of the spring arms 126 are free from the housing, thus forming a leaf spring. When snapped into the housing 110, a lip 126b of each spring arm 126 mates with a stop surface 118a of the window 118 to snap the cartridge 120 into the housing 110. Squeezing the exposed, free portions of the spring arms 126 towards one another will disengage the lips 126b from the stop surfaces 118a of the handle 110 to allow the cartridge 120 to be pushed out of, or otherwise removed from, the chamber 116 of the handle 110.

Once the patch pod cartridge 120 is inserted into the handle 110, the awl assembly 130 can be moved into the fully extended position, with the push rod passing through the hole 114a of the wall 114, into the patch pod cartridge 120, via the hole 124, and out the distal end of the cartridge gate 122. When the push rod 132 is forward, the cap 140 cannot be placed on the handle 110. This is intentional, as when the push rod 132 is visible, the adhesive container has been punctured and is ready for dispensing.

In the present embodiment, patch pod cartridge 120 is an encapsulated module that is removable from, and insertable into, the chamber 116 of the handle 110. The cartridge 120 includes a housing 121 having upper and lower shells 121a, 121b, that surround the elevator assembly 150. Once the elevator assembly 150 is loaded into the housing 121, the two halves 121a, 121b can be sealed together by snap fit, friction fit, adhesive, sonic or heat welding, etc., as desired.

The housing 121 includes a front face 125 that forms part of the front face of the tool 100 when the cartridge 120 is snapped into the handle 110. The front face 125 of the upper housing shell 121a includes the gate 122, which is aligned with hole 124 through the rear face of the upper shell 121a. In the present particular embodiment, the front face 125 permits the tool 100 to be held flush against the surface of the outer tire, to assist in positioning the cartridge gate 122 through the puncture in the outer tire.

Like the hole 114a described in connection with the handle 110, in the present embodiment, cartridge hole 124 is keyhole shaped to accommodate the awl or push rod 132 and finger 131 of the push rod assembly 130. As will be described more particularly below, the finger 131 formed on the bottom of the push rod 132 is used to facilitate the puncturing of an adhesive pod, as well as to raise the elevator assembly 150 into the deployment position.

Figures 5, 5A:
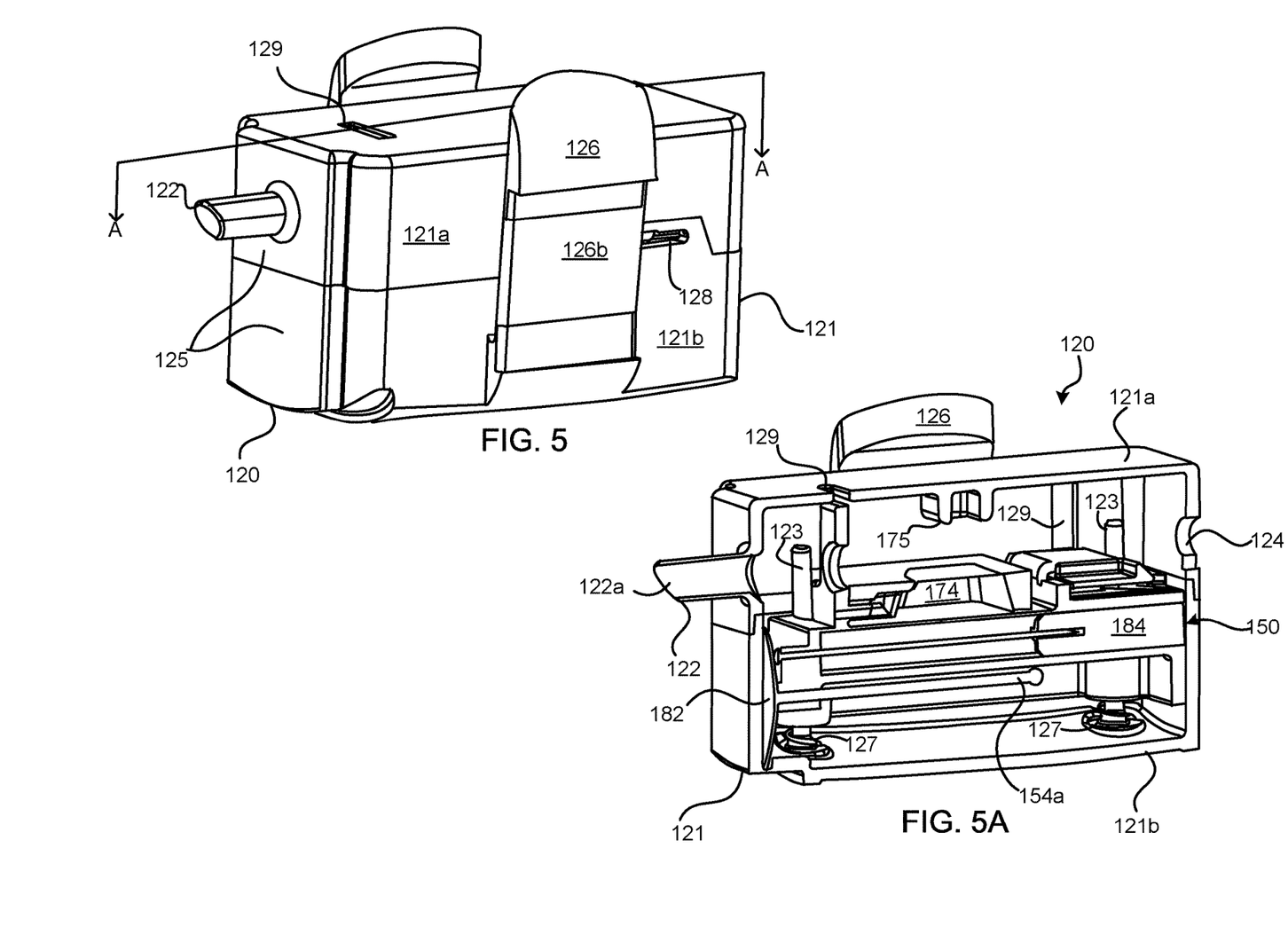
FIG. 5 is an enlarged perspective view, taken from the front, of the patch pod cartridge of FIG. 4.
FIG. 5A is a cross-sectional view of the patch pod cartridge of FIG. 5, taken across cross-section A-A indicated in FIG. 5.
Figure 6A:
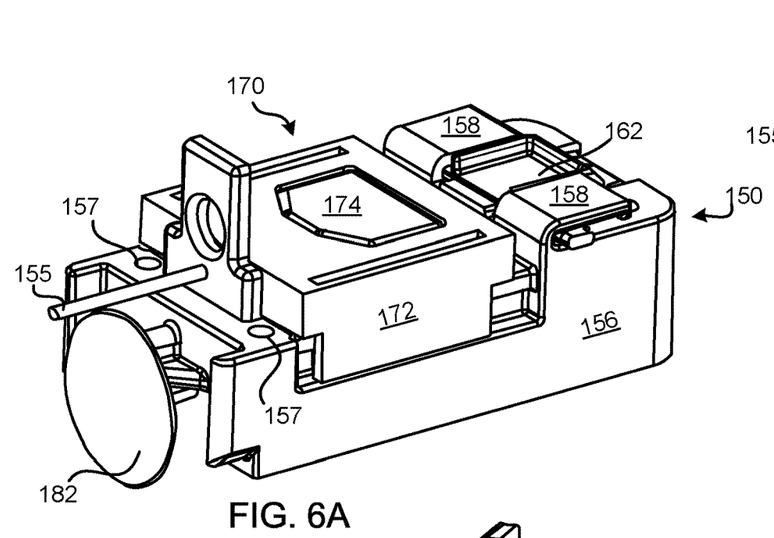
FIGS. 6A and 6B are perspective views taken from the front and rear, respectively, of an elevator assembly in accordance with one particular embodiment of the present invention.
Figure 6B:
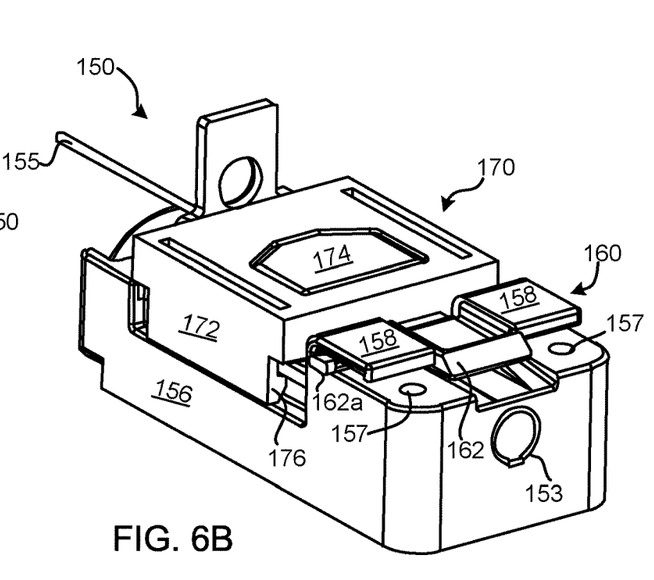
Figure 7:
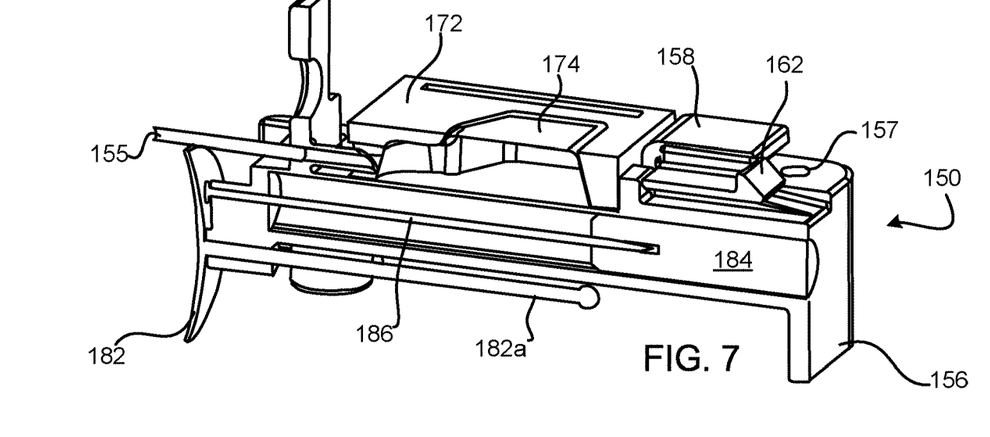
FIG. 7 is a cross-sectional, perspective view of an elevator assembly in accordance with one particular embodiment of the invention.
Figure 8A:
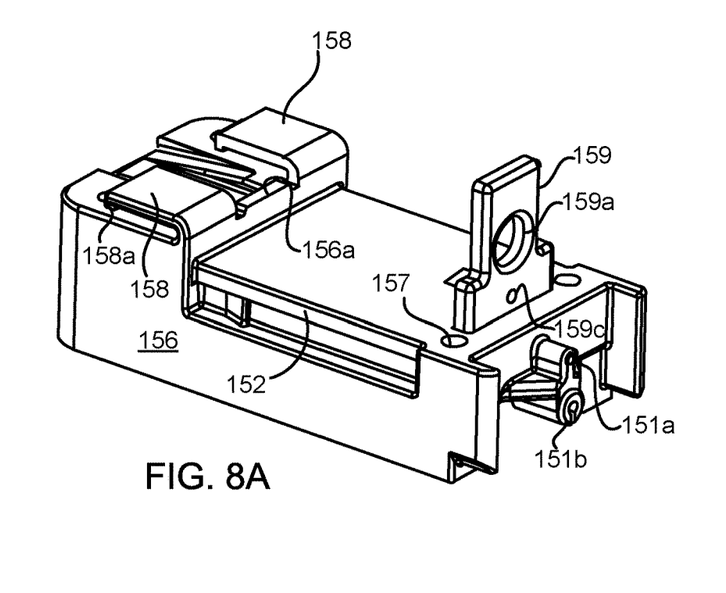
FIG. 8A is a perspective view taken from the front of the elevator housing in accordance with one particular embodiment of the invention.
Figure 8B:
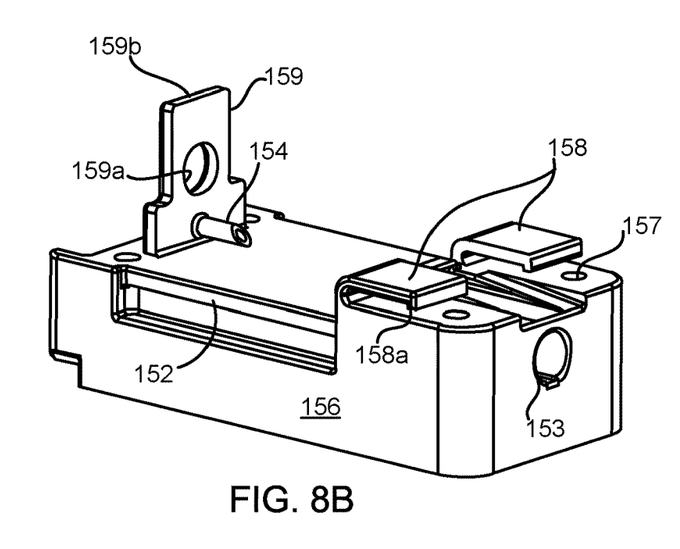
FIG. 8B is a perspective view taken from the rear of the elevator housing of FIG. 8A.
Figure 9:
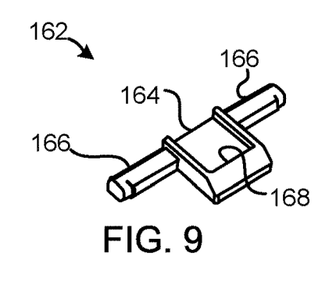
FIG. 9 is a perspective view of a slidable latch in accordance with one particular embodiment of the invention.
Figure 10:
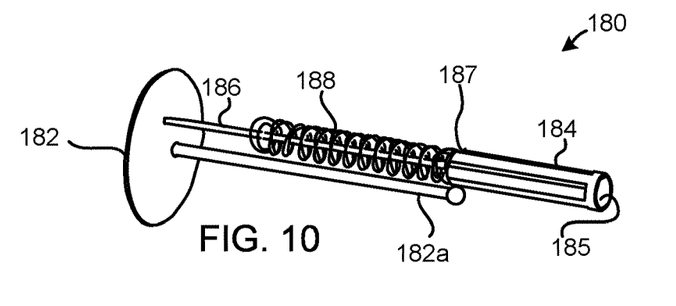
FIG. 10 is a perspective view of a patch push rod subassembly in accordance with one particular embodiment of the invention.

Additionally contained within the housing 121 are four posts 123 (of which only two are shown in FIG. 5A) connected to the inner bottom surface of the lower shell 121b. Each post 123 has a coil spring 127 mounted concentrically thereon. The elevator assembly 150 is also mounted on the posts 123, above the springs 127, such that the elevator assembly 150 can move up and down on the posts 123, via the through holes 157 in the elevator assembly body 156. The interior chamber formed by the cartridge housing 121 is sized to contain the elevator assembly 150 in its initial, lower position, as well as in its final, elevated position.

The Patch Pod Assembly:

The elevator assembly 150 includes the elevator body 156, the latch mechanism 160, an adhesive sub-assembly 170 and the patch subassembly 180. The elevator body 156 serves as a support for the adhesive sub-assembly 170 and the patch subassembly 180, and includes, integrally formed therewith, the retention arms 158 of the latching mechanism 160 and an indicator flag wall 159. The indicator flag wall 159 is provided with a hole 159a that receives and centers the push rod 132 of the awl assembly 130 when the elevator assembly 150 is in its lower position. When the patch pod assembly is elevated into its raised position, an upper face 159b of the indicator flag wall 159 passes through a slot 129 in the upper face 121a of the cartridge housing 121 and is visible through a window 111 of the handle 110. In one particular embodiment of the invention, when the elevator assembly 150 is in its elevated position, a top portion of the indicator flag wall 159 will pass through the window 111 and extends above the upper surface of the handle 110 to indicate that the adhesive has been dispensed.

The Adhesive Subassembly:

As discussed above, the elevator assembly 150 includes an elevator body 156 configured to hold an adhesive pod 174 and patch 182. In the present preferred embodiment, the adhesive pod 174 contains the adhesive used to secure the patch 182 to the punctured inner tube. In one particular embodiment of the invention, the adhesive pod 174 has a plastic housing and a foil seal that is ruptured to release the adhesive. The use of a foil housing keeps the adhesive viable over long periods of time, extending the shelf life of the cartridge 120.

In one preferred embodiment of the invention, the adhesive used in the adhesive pod 174 acts as both a lubricant for the patch and an adhesive with vulcanizing capabilities. In one particularly preferred embodiment of the invention, the adhesive is infused with fiber, which will form a patch after coming in contact with the inner tube and will seal the puncture on the inner tube like a liquid patch, in addition to the use of the patch 182, described herein. With regard to the patch 182, itself, in one particularly preferred embodiment of the invention, the patch is made of a special rubber compound having high elasticity and which is strong enough to withstand pressure up to 200 psi. In the present embodiment, patch 182 includes a tether 182a attached to the patch 182, which can be used to center the patch 182 and to allow the patch 182 to be properly positioned, as well as to fill the puncture site in the tire and keep out debris.

The adhesive subassembly 170 includes the adhesive cage 172 and the adhesive pod 174. The adhesive cage 172 is formed with arms 176, on opposing sides thereof, which grasp rails 152 on each side of the body 156 to maintain the adhesive cage 172 in contact with the body 156. As will be described more particularly below, the adhesive cage 172 is slidable along the rails 152 to move the adhesive pod from a rear position, distal from the needle 154 on the body 156, to a forward position in which the adhesive pod 174 is rammed onto, and ruptured by, the needle 154 extending from the indicator flag wall 159. Needle 154 may be made of plastic, metal or some other rigid material and is, most preferably, integrally formed with the body 156. Needle 154 and, correspondingly, indicator flag wall 159, is formed with a passageway through which the adhesive passes. The side of the needle 154 opposite the adhesive pod 174 is sized to receive, or is integrally formed with, a straw 155, which is used to channel adhesive stored in the pod 174 into the cartridge gate 122 and/or onto the patch 182. Alternately, a passageway 159c through the wall 159 permits a needle 154 attached to one side of the wall 159 to be connected in fluid engagement with the straw 155 attached to the other side of the wall 159.

The Latching Mechanism:

The elevator assembly 150 is maintained in the housing 121 in its lower position by a latching mechanism 160, as illustrated in FIG. 5A. Latching mechanism 160 includes the latch 162, latch retention arms 158 integrally formed on the elevator body 156 and slots 128 on the lower patch pod cartridge housing 121b. More particularly, the arms 158 maintain the latch 162 in close proximity to the elevator body 156, while permitting the latch 162 to slide forward and backward along the longitudinal axis of the body 156. The body 164 includes a lip 168 that is configured to be pulled by the finger 131 of the push rod 132, in order to move the latch 162 to the unlatched position. The travel of the latch 162 is limited in the front by the connection between the arms 158 and the body 156, and by a stop block 156a. The travel of the latch 162 is limited at the open ends of the arms 158 by catches 158a on the ends of the arms 158, which block the latch 162 from exiting the retaining arms 158.

The latch 162 includes a main body 164 disposed between two wings 166. The wings 166 are retained under the arms 158, while the tips of the wings 166 are retained in the slots 128 of the cartridge housing 121. The distal ends 128a of the slots 128 (i.e., towards back of the cartridge 120) are aligned with channels 129 formed in the cartridge housing 121, such that, when the latch 162 is pushed forward, the wings 166 are engaged in the slots 128 and the elevator stays in the lowered position; but when the latch 162 is pulled towards the rear of the cartridge 120, the wings 166 slid in the slots 128 until they are aligned with the channels 129 formed in each side of the cartridge housing 121. This aligns (i.e., places) the tips of the wings 166 into the channels 129, which releases the latching mechanism 160 and permits the elevator assembly to rise on the posts 123.

Once the latching mechanism 160 is released and the awl 130 is removed, the elevator assembly 150 will rise on the posts 123 (biased upwards by the four compressed coil springs 127) to align the patch pod push rod 187 and patch 182 of the patch subassembly 180 with the point 139 of the push rod 132 and with the cartridge gate 122. The release of the elevator assembly 150 also results in the foil top of the adhesive pod 174 being rammed against the stud 175, which causes the adhesive to be dispensed from the cartridge 120 via the needle 154 (upon which the adhesive pod 174 was previously impaled) and thru straw 155.

The Patch Subassembly:

The patch subassembly 180 is carried by the elevator body 156 in alignment between the passageway 153, which receives the push rod 132 therein, and the passageway 151a, which supports and centers the push pin 186. The subassembly 180 includes the patch 182, the patch push rod 187 (made up of the handle 184 and push pin 186), and the patch subassembly spring 188. One end of the push pin 186 is fitted into a cylindrical blind hole formed in the handle 184, while the other end of the push pin 186 abuts the back face of the patch 182, while the stem of the patch 182 is pressed into (through a slot in the bottom), and maintained in place by, a clip 151b formed in the body 156. The push rod 187, and in particular, the push pin 186, is used to push the patch 182 into the tire like a folded umbrella, which unfolds once injected into the tire. In one particular embodiment of the invention, although the push rod 187 is sized to push the body of the patch 182 into the tire, its tether remains outside of the tire.

The push pin 186 and handle 184 are configured to move together when the patch push rod 187 is pushed forward by the awl assembly 130 while the elevator assembly 150 is in its elevated position. An indentation or chamber 185 at the end of the handle 184 is sized to receive the point 139 of the awl assembly 130 therein, so that the push rod 187 and awl assembly 130 can be coupled to push the patch 182 from the cartridge 120. In one particular embodiment, the indentation 185 is conical in shape, in order to receive the conical tip 139 of the push rod 132.

The spring 188 is a compression spring that uses a face of the handle 184 as a first bearing surface and the inner wall of the elevator body 156 as a second bearing surface to compress the spring 188, when the handle 184 is advanced. More particularly, when the elevator assembly 150 is in the elevated position and the point 139 of the push rod 132 is engaged with the handle 184, forward movement of the awl assembly 130 will compress the spring 188 against the elevator body 156 while the patch 182 is pushed out through the gate 122. Once the point 139 of the awl assembly 130 is withdrawn into the handle 100 (after deployment of the patch 182) and out of the recess 185 and cartridge housing 121, the spring 188 will decompress, thus withdrawing the push pin 186 to its normal position out of the gate 122 and within the body 156.

Tire Repair Tool Kit or System:

In one particular embodiment of the invention, the tire repair tool 100 is sold as a kit or system, including one handle 110 and a plurality of interchangeable, disposable cartridge portions 120. In one particular embodiment, the plurality of interchangeable, disposable cartridge portions 120 are the same, thus providing a kit including refills. In another particular embodiment of the invention, each of the plurality of interchangeable, disposable cartridge portions 120 is configured for use with a different style bicycle tire, including, but not limited to, clincher, tubular, tubeless, mountain, cross-country, city and/or cruiser bicycle tires. In one particular embodiment of the invention, a kit is provided having a single handle 110 and a plurality of cartridge portions 120, wherein the gate 122 of each cartridge 120 has a different length based on the different thicknesses of the different types of tires (i.e., mountain, city, etc.) for which the specific cartridge portion is to be used. The foregoing is not meant to be limiting, as the repair tool can be provided with only one cartridge portion 120, if desired.

In a further alternate embodiment of the present invention discussed above, the handle 110 and cartridge 120 may be constructed as a single unit which is disposable or reusable, as desired.

Figure 11:
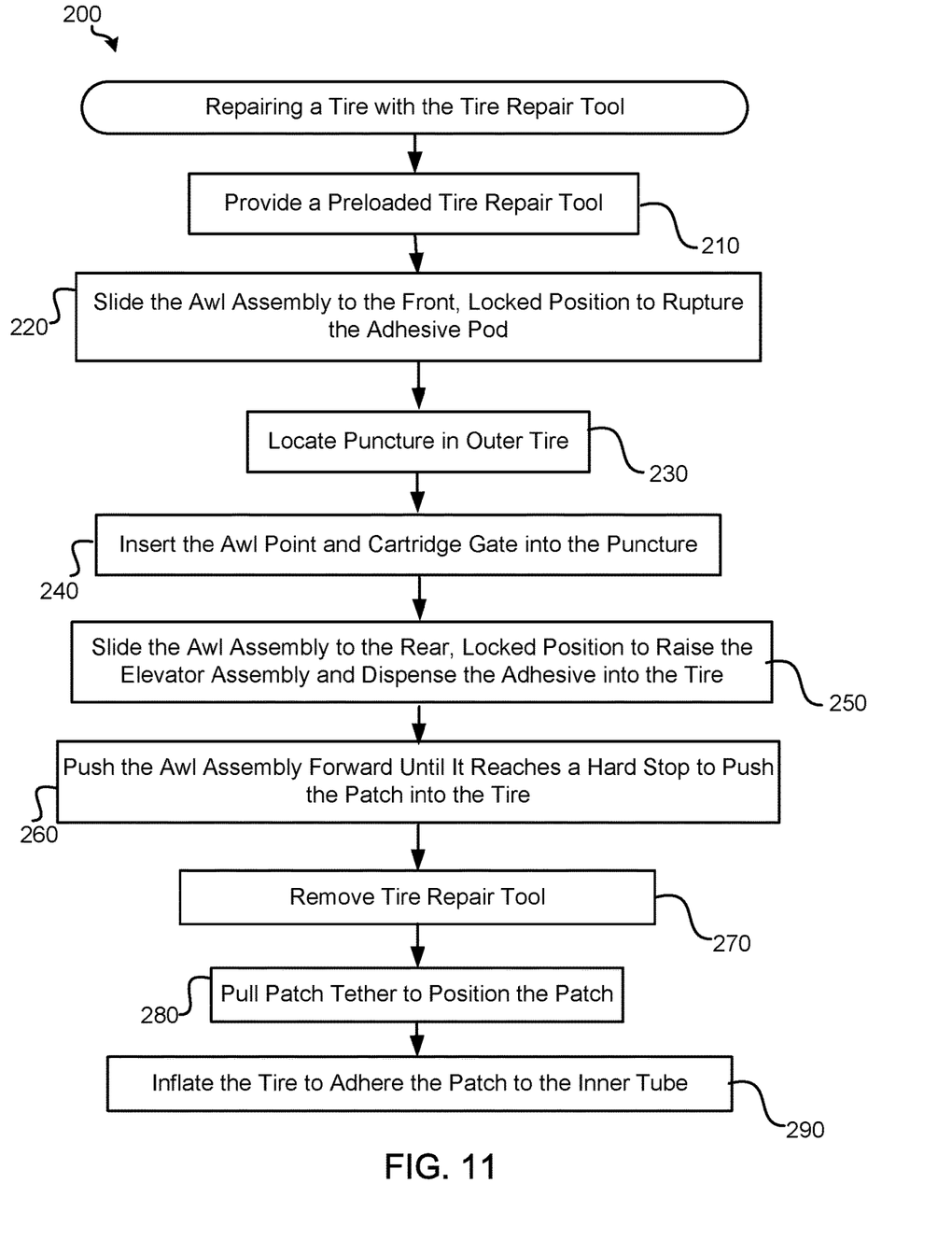
FIG. 11 is a flow diagram illustrating the use of a tire repair tool in accordance with one particular embodiment of the present invention.
Figure 12:
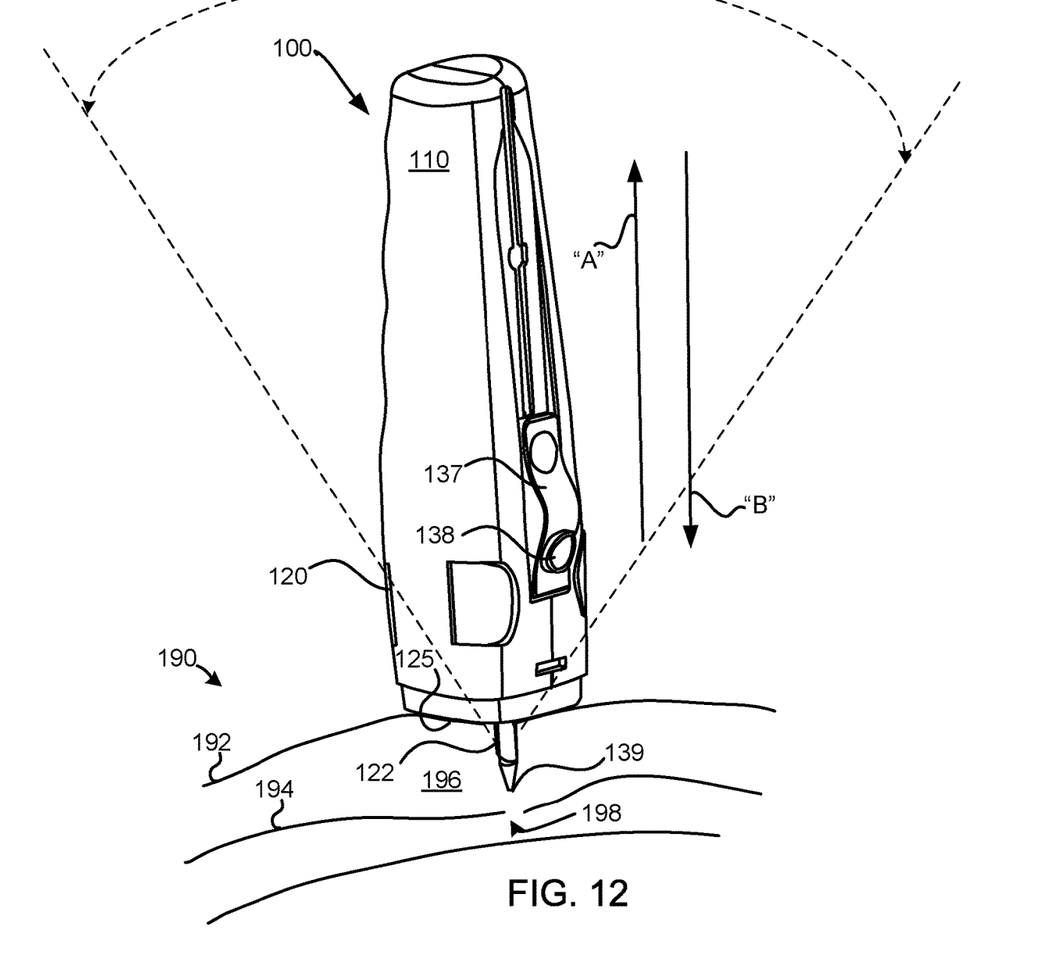
FIG. 12 is a perspective view of a repair tool interfacing with a punctured tire, which view is useful in illustrating a method of using one embodiment of a repair tool of the present invention.

Operation:

Referring more particularly to FIGS. 1-12, and in particular, FIGS. 11 and 12, there will be described a method 200 of using a tire repair tool 100 to repair a punctured inner tube of a tire 190, in accordance with one particular embodiment of the invention. More particularly, the tool 100 is used to inject an adhesive and patch 182 through a puncture in the outer tire 192, in order to repair a puncture of the inner tube 194.

More particularly, a preloaded repair tool 100 is provided. Step 210. In the preloaded state, the tool 100 includes an intact adhesive pod 174 in the patch pod adhesive cage 172. The latching mechanism 160 is latched with the patch pod elevator assembly 150 in its lower position and the cartridge springs 127 compressed. At this point, the awl assembly 130 is in its rear locked position, with the awl point 139 outside of the cartridge 120.

The awl assembly lock button 138 is then depressed to permit sliding of the awl assembly 130 within the handle 110. Once released, the awl assembly 130 is moved to the front, locked position of the tool, in order to rupture the adhesive pod. Step 220. More particularly, with the elevator latching mechanism 160 still engaged, the user slides the awl assembly 130 forward (in the direction of arrow "B" of FIG. 12). In doing so, the finger 131 on the push rod 132 engages a bearing surface on the patch pod adhesive cage 172 and, as the awl assembly 130 is pushed forward, the finger 131 drives the adhesive cage 172 forward, causing the adhesive pod 174 to be impaled by, and retained on, the needle 154. Thus, adhesive in the adhesive pod 174 is in fluid communication with the needle 154, and via the needle 154, with the straw 155.

In this front, locked position, the awl assembly 130 is arranged with the shaft 132 of the awl assembly 130 passing through the hole 114a in the rear cartridge chamber wall 114 of the handle 110, the hole 124 in the rear of the cartridge housing 121, the hole 159a through the indicator flag wall 159 of the elevator body 156, the front wall of the cartridge housing 121 and extends out from the cartridge gate 122, all of which are aligned when the elevator body is in the lower position. In this preloaded state, the push rod 132 extends through the gate 122, with the point 139 extending beyond the gate opening 122a (see, for example, FIG. 12).

With the tool 100 in hand, the puncture through the outer tire 192 is located. Step 230. If necessary, the awl point 139 is used to clean any debris from the outer tire puncture site. Then, the tire 190 is pinched and the awl point 139 is inserted into the puncture of the outer tire 192. The awl point 139 is worked into the puncture until the gate 122 is also inserted into the outer tire 192 at the puncture. Step 240 The awl point 139 and gate 122 are inserted into the outer wall 192 of the tire 190 until the cartridge face 125 of the tool 100 is flush with the outer surface of the tire 190 with the tool 100 held upright (i.e., between about 11:00 o'clock to about 1:00 o'clock relative to the tire puncture, as illustrated in FIG. 12), thus ensuring that the gate 122 is fully inserted into the wall of the outer tire 192 and that gravity can assist the flow of the adhesive from the straw 155. In one example, the length of the gate 122 is selected to ensure that when the face 125 is flush with the outer surface of the outer tire, at least a portion of the gate 122 extends past the inner wall of the outer tire, into a space 196 between the outer tire 192 and the inner tube 194. In the present invention, the cartridge 120 and/or tool 100 can be targeted to a particular type of tire, such that the length of the gate 122 is selected to ensure that the gate opening 122a is at least flush with the inner wall the outer tire 192, and more preferably, extends beyond the inner wall of the outer tire 192 into the space 196 above the punctured (and thus deflated) inner tube 194.

Then, the awl assembly lock button 138 is depressed and the awl assembly 130 is moved backwards into the handle 110 (i.e., in the direction of arrow "A" of FIG. 12) to its rear, locked position, to retract the awl point 139 back into the handle 110 and completely withdraw it from the cartridge 120. This leaves the gate 122 in, and most preferably, through the outer wall 192 of the tire 190, with its opening 122a unblocked by the awl point 139. As the awl assembly is being withdrawn from the cartridge 120, a rear edge of the finger 131 of the push rod 132 engages the lip 168 of the latch 162, pulling it backward and releasing the latching mechanism 160.

Pulling the latch 162 backwards towards the rear of the cartridge housing causes the wings 166 of the latch 162 to be released from their locking engagement with the front portion of the slots 128 of the cartridge housing 121, and aligns the wings with the channels 129 formed in the cartridge housing. This permits the elevator assembly 150 to rise to its elevated position. The fast rise of the elevator assembly 150 causes the foil top of the adhesive pod 174 to be rammed against the stud 175 on the inner surface of the upper shell half 121*a*. The force applied to the foil top by the stud 175 pushes the adhesive from the adhesive pod 174, and dispenses it through the straw 155 and out of the cartridge 120, on and around the puncture in the inner tube 194. Step 250.

Once the elevator assembly 150 is in the elevated position (step 250), the patch push rod 187 becomes aligned between the cartridge hole 124 and the push rod gate 122. In this configuration, the distal end of the push rod handle 184 is aligned with the cartridge hole 124 and, correspondingly, with the cartridge chamber hole 114*a*. The awl assembly lock button 138 is again depressed and the awl assembly 130 is slid forward by the user (in the direction of arrow "B" of FIG. 12) until it reaches a hard stop, in order to push the patch body 182 into the tire 190. Step 260. More particularly, with the elevator assembly raised, the awl assembly 130 is pushed forward to engage the awl point 139 with a recess 185 in the push rod handle 184, in order to push the push rod 187 forward. The patch push rod 187, thus coupled with the push rod 132 of the moving awl assembly 130, pushes the patch 182 out from the gate 122 and into the space 196 between the outer tire 192 and the inner tire 194. In one particular embodiment of the invention, the push rod 187 is sized to push the body of the patch 182 into the tire 190, while its tether remains outside of the tire 190.

Once the adhesive and the body of the patch 182 are injected into the space between the inner tube 194 and the outer tire 192, the tool 100 can be removed from its engagement with the tire 190. Step 270. The user can then pull the patch tether upwards, to position the body of the patch 182 against the inside of the tire 190, i.e., against the inner surface of the outer tire 192 and directly over the hole 198 in the punctured inner tube 194. Step 280. The use of a patch tether is additionally described in U.S. Pat. No. 9,205,607, incorporated herein by reference. The tether and patch body thus fill the puncture site through the outer tire 192 to keep out debris. Additionally, once the inner tube 194 is inflated, the air pressure will push the inner tube 194 against the body of the patch 182 and against the inner surface of the outer tire 192 to complete the vulcanizing of the adhesive and patch. Step 290. Additionally, if desired, after the tether is pulled, the user can also press down on the tire 190 above the patch 182, so that the vulcanization of the patch to the inner tube 194 can start before inflation of the inner tube 194 begins.

The adhesion and/or vulcanization of the body of the patch 182 to the inner tube 194 creates a permanent patch of the tire 190, without requiring the removal of the tire 190 from its rim. In one particular embodiment of the invention, a vulcanizing adhesive is used that vulcanizes the patch to the inner surface of the outer tire 192, as well as the outer surface of the inner tube 194.

In one particularly preferred embodiment of the invention, after using the tool 100 in the method 200, the awl assembly 130 is again fully withdrawn from the cartridge 120 (i.e., by sliding the awl assembly in the direction of arrow "A" of FIG. 12, to its rear, locked position). This disengages the awl assembly 130 from the cartridge 120, thus permitting the cartridge to be removed from the handle 110. In the embodiment illustrated, the cartridge 120 can be removed by simultaneously squeezing both spring arms 126 and pushing them out of the windows 118. Once removed from the handle 110, the spent cartridge 120 can be disposed of, and a new cartridge can be inserted into the handle 110. Alternately, if designed as a single use tool, the entire tool 100 can be thrown away.

As can be seen, the tire repair tool of the present invention installs a patch through the existing exterior puncture of the tire to seal and permanently patch an inner tube of the tire, allowing the tire to remain attached to the rim during the repair. Thus, the present invention provides an improved cartridge for a convenient, easy-to-use, tire repair tool and a method useful for permanently patching tires, in situ, without removing the tire from the wheel or the wheel from the conveyance.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

I claim:

1. A tire repair tool, comprising:
    a housing containing:
        a push rod assembly; and
        a patch pod assembly including a patch;
    an outlet tube;
    said patch pod assembly including an elevator body movable within the housing from a first, lowered position to a second, elevated position, said patch being aligned with said push rod assembly and said outlet tube in said second, elevated position;
    said elevator body maintained in said first, lowered position by a latching mechanism separate from said push rod assembly.

2. The tool of claim 1, wherein said push rod assembly is configured to unlatch said latching mechanism and raise said patch pod assembly from said first, lowered position to said second, elevated position.

3. The tool of claim 1, wherein said push rod assembly includes a first push rod movable between a first, extended position in which a point of the first push rod extends outside of the housing from an orifice of the outlet tube and a second, withdrawn position in which the first push rod is withdrawn into the housing and out of said outlet tube.

4. The tool of claim 1, wherein said patch pod assembly is contained in a cartridge housing, and said elevator body moves between said first, lowered position and said second, elevated position on at least one post mounted in said cartridge housing.

5. The tool of claim 4, further including a spring circumferentially mounted on said at least one post between a floor of said cartridge housing and said elevator body, said latching mechanism configured to maintain said elevator body in said first, lowered position when latched and to permit the spring to bias the elevator body into the second, elevated position when unlatched.

6. The tool of claim 5, wherein said latching mechanism includes a latch body, a portion of said latch body interacting with a portion of said cartridge housing in a latching configuration to keep said elevator body in said first, lowered position, and wherein said first push rod includes a finger engageable with a portion of said latch body to move said portion of said latch body out of said latching configuration with said cartridge housing, whereby the elevator body is moved to its second, elevated position.

7. The tool of claim 4, wherein said patch pod assembly includes an adhesive pod contained in an adhesive cage, said adhesive cage mounted to said elevator body in a slidable configuration.

8. The tool of claim 7, wherein said adhesive pod is an adhesive filled foil container and said elevator body includes a needle for rupturing said foil container when said adhesive cage is slid against said needle.

9. The tool of claim 4, wherein said elevator body carries a patch subassembly including a patch push rod in contact with said patch.

10. The tool of claim 9, wherein said patch push rod is disposed in said housing between said first push rod and said outlet tube when said elevator body is in its second, elevated position.

11. The tool of claim 10, wherein actuation of said push rod assembly when said elevator body is in said second, elevated position causes said first push rod to couple with said patch push rod to eject said patch out from said outlet tube.

12. The tool of claim 11, wherein actuation of said push rod assembly when said elevator body is in said first, lowered position causes an adhesive containing pod to be ruptured.

13. A tire repair tool, comprising:
a housing including an outlet tube, said housing containing:
a push rod assembly aligned with said outlet tube;
a patch pod assembly including a patch;
said patch pod assembly movable within the housing from a first, lowered position to a second, elevated position, said patch being aligned with said outlet tube in said second, elevated position;
said push pod assembly is contained in a cartridge housing removable as a unit from said housing, wherein a portion of said push rod assembly is configured to slide through said cartridge housing and out said outlet tube.

14. A method of repairing a tire on a wheel or rim, comprising the steps of:
providing a tire repair tool according to claim 1;
inserting the outlet tube into a puncture of the outer tire;
actuating the push rod assembly to eject the patch out of the housing via the outlet tube and into the tire without removing the tire from the wheel or rim.

15. The method of claim 14, wherein the tire repair tool housing includes a body portion and a cartridge portion separable from the body portion.

16. The method of claim 14, further comprising the steps of, rupturing an adhesive pod and discharging an adhesive into said tire prior to said actuating step.

17. A method of repairing a tire on a wheel or rim, comprising the steps of:
providing a tire repair tool including:
a housing including an outlet tube, said housing containing:
a push rod assembly aligned with said outlet tube;
a patch pod assembly including a patch;
said patch pod assembly movable within the housing from a first, lowered position to a second, elevated position, said patch being aligned with said outlet tube in said second, elevated position;
inserting the outlet tube into a puncture of the outer tire;
actuating the push rod assembly to unlatch a latch, thereby raising the patch pod assembly from the first, lowered position to the second, elevated position; and
actuating the push rod assembly to elect the patch out of the housing via the outlet tube and into the tire without removing the tire from the wheel or rim.

18. The method of claim 17, further comprising the steps of:
after the ejecting step, pulling a tether of the patch to pull a body of the patch against an inner surface of the outer tire.

19. The method of claim 18, further comprising the step of:
inflating an inner tube disposed in the outer tire to push the inner tube against the patch body in an area of a puncture in the inner tube.

20. A tire repair tool kit, comprising:
a housing including a cartridge receiving chamber and a push rod assembly;
a plurality of cartridge portions, each separable from and engageable with said housing, each cartridge portion including a patch pod assembly including a patch, each patch pod assembly movable in said respective cartridge portion from a first, lowered position to a second, elevated position, said patch being aligned with said push rod assembly in said second, elevated position;
each cartridge portion of said plurality of cartridge portions being removable as a unit from said housing, wherein a portion of said push rod assembly is configured to slide through a respective cartridge housing and out an outlet tube when a respective cartridge portion is engaged with said housing in said cartridge receiving chamber; and
said housing configured to mate with each cartridge portion of said plurality of cartridge portions such that said push rod assembly is configured to eject said patch from said outlet tube when said patch pod assembly is in the second, elevated position.

* * * * *